United States Patent Office 2,874,545
Patented Feb. 24, 1959

2,874,545

GELS AND PROCESS FOR MAKING THEM

Ralph Hubert Twining, Coudersport, Pa., assignor to L. H. Lincoln & Son, Inc., Coudersport, Pa., a corporation of Pennsylvania No Drawing. Application March 2, 1954
Serial No. 413,709

18 Claims. (Cl. 61—36)

This invention relates to colloidal gels and to methods of producing and using such gels. It is particularly concerned with colloidal gels obtained from sulfite waste liquors and other organic substances having a similar or related structure.

It is an object of the invention to provide slow-settting, substantially water-insoluble gels by the reaction with sulfite waste liquor of chromic acid and boric acid.

Another object of the invention is to provide similar gels by the reaction of other organic materials, having a polyhydric phenolic structure, with chromic acid and boric acid.

Another object of the invention is to provide compositions which when mixed with water result in the formation of gels of the character described.

A further object of the invention is to provide gels of the character described which have a very long setting time.

Another object of the invention is to provide gels of the character described which when set have an alkaline reaction.

A further object of the invention is to provide gels of the character described which are useful for impregnating porous ground formations of large size or at great depths and rendering such formations impervious to water.

Additional objects and advantages of the invention will be apparent from consideration of the following description.

In the manufacture of paper pulp by the well known sulfite process large quantities of waste liquor are obtained. This waste liquor comprises not only lignin reaction products, but also sugars and other materials. By a rough purifying process and evaporation, products may be obtained which consist largely of what are called lignosulfonic acids. Such products have been placed on the market as liquid concentrates containing about 50% solids. In some cases the so-called lignosulfonic acids in the waste liquor are neutralized and thus the major portion of the product consists of lignosulfonates. Usually lime is used for such neutralization and the resultant product, which may be marketed either as a concentrated solution or as a dry granular or powdered material, is largely calcium lignosulfonates. Although many uses have been suggested for sulfite waste liquor and it has been employed in the manufacture of various products as well as for fuel, a serious problem in the pulp industry results from the large quantities of such liquor produced. Accordingly, new uses of sulfite waste liquor and lignosulfonic acids or sulfonates have been sought.

The production of gels by reaction of chromic acid with sulfite waste liquor has been previously described. However, by the methods described the gels are formed very quickly. Prior attempts to increase materially the time required for setting of such gels resulted only in an extremely serious weakening or lack of strength in the gels produced. Accordingly, the gels of this type hitherto available have been of very limited usefulness. For example, there is much demand for a material which may be used in the liquid state to impregnate porous earth or rock formations and which will, after such impregnation, change to an insoluble solid that fills the pores and renders the porous formation impervious to water. Because of their rapid setting the previously described chromic acid sulfite waste liquor gels are not suitable for such use.

It has now been found that substantially water insoluble, colloidal gels having very long setting times may be formed by the reaction of solutions of boric acid and chromic acid with sulfite waste liquor, whether neutralized or not, which is made from coniferous woods. Sulfite waste liquor made from decidous woods only is not suitable for the production of gels according to the present process, although products containing mixtures of the two types of liquor may be satisfactorily used if the liquor from coniferous woods is predominant. Hereinafter, therefore, by the phrase "coniferous sulfite liquor" there is meant a sulfite waste liquor containing at least a predominant amount of liquor from the pulping of coniferous woods and the phrases "coniferous lignosulfonic acids" and "coniferous lignosulfonates" refer, respectively, to lignosulfonic acids and neutralized lignosulfonic acids in or obtained from "coniferous waste liquor." For the purpose of the present invention either coniferous sulfite liquor, as such or after concentration, or coniferous lignosulfonates, in solution or as dry products, may be employed. However, when coniferous lignosulfonates are used, additional acid is required in order to reconvert the lignosulfonates to lignosulfonic acids.

As indicated above, the novel gels of the present invention are formed as a reaction product resulting from mixing together chromic acid, boric acid and coniferous sulfite liquor in aqueous solutions. In practical operation of the process, however, chromic acid is not added as such. Instead, a soluble chromate or dichromate is employed and sufficient acid is added to the mixture to release the chromic acid in the chromate or dichromate. Although other soluble chromates and dichromates are usable, for most purposes economic considerations limit the available salts to sodium chromate and sodium dichromate. The conversion of these salts to chromic acid is illustrated in the following equations where "Ac" represents an acid forming element or radical.

$$Na_2CrO_4 + 2HAc \rightarrow H_2CrO_4 + 2NaAc$$
$$Na_2Cr_2O_7 \cdot 2H_2O + 2HAc \rightarrow 2H_2CrO_4 + 2NaAc + H_2O$$

While any acid of sufficient strength may be used to free chromic acid from a soluble chromate or dichromate, it is preferred to employ boric acid for this purpose since with other acids the further, gel-forming reaction may be controlled only with great difficulty, if at all.

In the following examples there are described typical methods of producing gels according to the present invention.

*Example 1*

Forty-eight grams of dry, commercial, lime-neutralized, coniferous sulfite liquor or calcium coniferous lignosulfonates and 8 grams of boric acid ($H_3BO_3$) were mixed with about 120 ml. of water at 70° F. Eight grams of sodium dichromate ($Na_2Cr_2O_7 \cdot 2H_2O$) were dissolved in about 10 ml. of water. The solutions, at 70° F., were mixed and the mixed solution on standing for approximately 3½ hours at room temperature became a stiff, substantially water-insoluble gel.

*Example 2*

Ninety-six grams of a lime-neutralized, coniferous sulfite liquor liquid concentrate containing approximately 50% solids (mainly calcium coniferous lignosulfonates) were mixed with 8 grams of boric acid and about 75 ml. of water. To this were added 8 grams of sodium dichromate dissolved in 5 ml. of water. The solutions were formed at about 70° F. and mixed. On standing, the mixed solution formed a gel quite similar to the gel of Example 1 in about 3½ hours at room temperature.

*Example 3*

A solution of 8 grams of sodium dichromate in about 5 ml. of water was added to a solution formed by mixing 4 grams of boric acid, 112 grams of a commercial unneutralized coniferous sulfite liquor concentrate containing about 50% solids (mainly coniferous lignosulfonic acids) and about 75 ml. of water. As prepared, the solutions were at a temperature of 70° F. A stiff gel like the ones of the preceding examples formed during standing at room temperature for about 3½ hours. The smaller amount of boric acid used in this example is accounted for by the fact that lignosulfonic acids were used rather than lignosulfonates and consequently no acid was required to reconvert the latter to lignosulfonic acids.

The times required for setting or formation of stiff gels may be greatly increased without detriment to the quality of the gels if borax ($Na_2B_4O_7 \cdot 10H_2O$) is used as a reacting material as well as boric acid. In most instances an amount of borax approximately equal in weight to the amount of boric acid used will be found satisfactory. Examples 4, 5 and 6 illustrate the effect of borax addition on the setting time of gels like those described above.

*Example 4*

The materials and procedure used were the same as in Example 1 except that 8 grams of borax were dissolved in the mixture of calcium coniferous lignosulfonates, boric acid and water before mixing with the sodium dichromate solution. A gel like that formed in Example 1 was obtained in about 6½ hours.

*Example 5*

The materials used were the same as in Example 2 except that 8 grams of borax were dissolved in the mixture of calcium coniferous lignosulfonates, boric acid and water before mixing with the sodium dichromate solution. A gel like that of Example 2 was obtained in about 6¼ hours.

*Example 6*

The procedure and materials employed were the same as used in Example 3 except for the dissolving of 8 grams of borax in the mixture of coniferous lignosulfonic acids, boric acid and water before combining with the sodium dichromate solution. A gel like that obtained in Example 3 formed in about 6½ hours.

Although it is not intended that applicant shall be bound by the theories hereinafter set forth, it is believed that the formation of gels according to the present invention may be explained as follows:

The lignosulfonic acids and lignosulfonates in sulfite waste liquors (as well as lignin, from which they are derived) are complex molecules containing a plurality of aromatic groups that may be oxidized to form phenols. Such oxidation is brought about by chromic acid, either used as such or liberated from chromates or dichromates by the boric acid employed in the mixtures herein described. Boric acid, with an ionization constant at 25° C. of only $6.4 \times 10^{-10}$, is normally regarded as a very weak acid. Ordinarily, in fact, it would not be considered strong enough to liberate chromic acid from chromates or dichromates, or to free lignosulfonic acids from lignosulfonates. It is, however, a manifestation of the unique characteristics of boric acid that, in the presence of polyhydric phenols, it does develop the strength to do both.

Thus, it is found that 7 grams of tannic acid (which contains a plurality of phenolic groups) when dissolved in 72 ml. of water gives a solution having a pH of 3.18. A solution made by dissolving 5 grams of boric acid in 125 ml. of water has a pH of 4.48. It would be expected that upon mixing these solutions the resulting solution would have a pH between the two values given, or about 4. Actually the pH of the resulting solution is 2.58 indicating a marked increase in acidity. This result is typical of the results obtained whenever polyhydric phenols or oxidized lignosulfonic acids and boric acid are in solution together. In a series of parallel experiments using all common mineral and organic acids in place of boric acid similar results have been obtained in no instance.

The addition of borax to a solution containing boric acid and a polyhydric phenol or oxidized lignosulfonic acids results in solutions the pH of which is somewhat higher than would be obtained without the borax but lower than would be expected. In illustration: a 5% borax solution has a pH of 9.28 and a 5% pyrogallol solution has a pH of 5.83. As pyrogallol is an exceedingly weak acid, it would be expected that a mixture of these solutions would have a pH not much if any below 9. Actually when the solutions are mixed, the pH of the mixture drops to 6.35. Although by molecular structure borax is an acid salt, the extremely low dissocation of the acid portion of the molecule and the high dissociation of the sodium salt portion cause it to ordinarily react quite strongly alkaline. For example, a 5% borax solution with a 9.28 pH when mixed with an equal weight of sulfuric acid solution with a pH of 3.33 gives a mixture with a pH of 9.15.

It appears, however, that in the presence of polyhydric phenols the acid portion of the salt is more highly dissociated and borax has the acid reaction generally characteristic of acid salts. This is indicated by the following: A solution of 1 gram of pyrogallol in 100 ml. of water, having a pH of 5.38, is brought to a pH of 7.0 with a few drops of 0.1 N NaOH. It is now a neutral solution of a mixture of pyrogallol and sodium pyrogallate. A solution of 1 gram of borax in 100 ml. of water, having a pH of 9.1, is brought to neutrality, pH 7.0, with 0.5 N HCl. It then contains borax, NaCl and boric acid. Upon mixing these two neutral solutions the pH of the mixture drops to 4.8. The production of the hydrogen ion concentration corresponding to this lowered pH can, it appears, only come from the action of the polyhydric phenol, pyrogallol, on the boric acid. The fact that borax in the presence of a polyhydric phenol or similar substance acts as an acid salt accounts for the fact that it may be added without any harmful effect to gel-forming mixtures in accordance with the present invention. On the other hand, true alkalis, such as sodium hydroxide interfere with the gel-forming reaction and if added in sufficient quantity will prevent gel formation.

The oxidation of the aromatic groups in the lignosulfonic acids and lignosulfonates to form phenols referred to above is accompanied by reduction of the hexavalent chromium in the chromic acid or chromate to the trivalent state. Under the conditions of these reactions, it appears that the chromium reacts with the phenolic groups and thereby forms very large macromolecules, that may include rather large amounts of water and thus constitute gels, by linking together a plurality of coniferous lignosulfonic acid or lignosulfonate molecules.

The presence of boric acid is, as previously explained, important to the reaction described in the preceding paragraph. Phenols, particularly polyhydric phenols, are rather readily oxidized to what may be called a quinone state. In this state polyhydric phenols are unable to react with trivalent chromium to form gels. Even when all of the phenolic groups present are not thus oxidized, gel formation will be rendered more difficult and less satisfactory. When boric acid is present such overoxidation of the aromatic groups in the coniferous lignosulfonic acids and lignosulfonates is apparently prevented or avoided, perhaps because of masking, i. e. temporary, loose bonding of the boric acid with the oxygens of the phenol groups formed after oxidation has begun, and strong gels are therefore obtained. It is believed that this masking action is concomitant with the increase in strength of the boric acid and like the latter it is unique.

The unique properties of boric acid with respect to the present invention are demonstrated by the outcome of an attempt to duplicate the result of the experiment set forth in Example 1 by using identical materials and procedure except for the use (instead of boric acid) of sufficient acetic acid to produce the same pH in the mixed solutions as was obtained with boric acid. The gel obtained was very soft and setting time was about 7 hours. Furthermore, it has been found that satisfactory, slow-setting gels are not obtained when mineral acids, such as hydrochloric acid, which are stronger than boric acid are substituted for the latter. In fact no acid, either mineral or organic, has been found which even approaches the unique action of boric acid in the practice of the present invention.

The validity of the theories advanced above is supported by the fact that gels, which are in all substantial respects very similar to those obtained in Examples 1 to 6 may be produced by the reaction of chromic acid and boric acid with tannic acid or vegetable tannins as well as with polyhydric phenols. With tannic acid and tannins, which have structures similar to those of lignosulfonic acids, it appears that a plurality of phenolic groups enter into the gel-forming reaction. It is well known that limited oxidation of many aromatic compounds results in the production of phenolic groups thereon. In the following examples it is shown that phenolic compounds readily react with chromic acid in the presence of boric acid to form gels. It may, therefore, be assumed that the formation of similar phenolic compounds is an intermediate step in the reaction between lignosulfonic acids and chromic acid in the presence of boric acid that results in the formation of a gel of substantially the same characteristics.

In the instances set out in the following examples of gel formation with phenolic substances the solutions were made up at 70° F. and allowed to stand at room temperature—about 70° F.

*Example 7*

A solution of 7 grams of tannic acid, 5 grams of boric acid and 3 grams of sodium dichromate $$(Na_2Cr_2O_7.2H_2O)$$

in 200 ml. of water was prepared. The solution formed a typical, firm water-insoluble gel in about 20 minutes.

*Example 8*

A solution was prepared containing 10 grams of a commercial, dried, chestnut tannin extract, 7.5 grams of sodium dichromate, 7.5 grams of boric acid, and 7.5 grams of borax ($Na_2B_4O_7.10H_2O$) in 180 ml. of water. After standing for about 2 hours the solution formed a firm, water-insoluble gel.

*Example 9*

A similar gel was obtained from a solution containing 20 grams of a commercial dried quebracho tannin extract, 10 grams of sodium dichromate and 10 grams of boric acid in 160 ml. of water. The gel formed after the solution had stood at room temperature for only about 2 minutes.

*Example 10*

Five grams of hydroquinone, 2.5 grams sodium dichromate, and 2.5 grams of boric acid were dissolved in 80 ml. of water. The solution upon standing for about 2½ hours gave a typical, substantially water-insoluble gel.

*Example 11*

A similar gel which, however, had a much longer setting time was obtained by using the ingredients set out in Example 10 but adding thereto 2.5 grams of borax. The setting time for this gel was about 48 hours. The gel product had approximately the same consistency or strength as the product in Example 10.

*Example 12*

Five grams of pyrogallol, 9 grams of sodium dichromate, and 5 grams of boric acid were dissolved in 200 ml. of water and allowed to stand. Within 2 minutes a firm, substantially water-insoluble gel, similar to those of the preceding examples, was produced.

*Example 13*

A solution containing 10 grams of resorcinol, 4 grams of sodium dichromate and 4 grams of boric acid was prepared with 60 ml. of water and allowed to stand. A firm gel showing only slight fluorescence was obtained in about 16 hours.

As with the gels from sulfite waste liquors, the use of boric acid in the production of gels according to the immediately preceding examples is apparently unique. This has been demonstrated by experiments in which other acids were substituted for boric acid in the compositions of some of the examples. Except for such substitution the solutions and conditions used were the same. No satisfactory gels were obtained but generally only mud-like precipitates. A striking illustration of the unique action of boric acid is seen in Example 13. As is well known, an oxidation product of resorcinol is the familiar dye, fluorescein. In the process of Example 13 a very satisfactory gel with only a trace of fluorescein was obtained. If, however, acetic acid is employed in the process, instead of boric acid, the fluorescein production is greatly increased and the gel formed is so weak as to be substantially valueless.

As indicated by Example 11 the setting time of gels formed according to Examples 7 to 13 may be greatly increased by the addition of borax to the gel-forming ingredients. For example, the addition of 4 grams of borax to the solution used in Example 13 increased the gel setting time to about 48 hours.

It has been found in general, that to produce gels of closely similar characteristics less water is used with sulfite waste liquor than with pure, i. e. true, polyhydric phenols or other compounds of closely similar fundamental structure, such as the tannins.

It appears that this is because the oxidized coniferous lignosulfonic acids have, in proportion, many fewer functional phenolic groups which may take part in the gel-forming reaction. Accordingly, the solutions of such acids must be more concentrated than those, for example, of pyrogallol to obtain similar results. It may be noted that no polyhydric phenol, or substance containing a polyhydric phenolic group in its structure, which has been tried has failed to form a gel according to the process of the present invention.

The novel gels prepared from coniferous sulfite liquor as well as those formed from tannins, polyhydric phenols and the like by the process of the present invention are adapted for a number of uses. One such use is in shafts, wells and the like to shut off or block flow of water or other liquids therethrough. For example, in cable tool drilling strata are often encountered from which water flows into the shaft in such quantities as to seriously impede, if it does not entirely prevent, drilling. If such water-bearing strata can be plugged to shut off the water, great savings are possible. In rotary well drilling where a drilling mud is used the weight of the mud normally prevents the inflow of water. However, "water loss," i. e. seepage of water from the drilling mud into porous formations encountered, frequently occurs. This necessitates constant supervision and adjustment of the mud and is therefore quite expensive. In some cases porous formations are met with which are so open that the drilling mud itself flows into them. Such a situation is very serious. At best, drilling costs are greatly increased. At worst, drilling must be discontinued and the investment in the well lost.

Novel gels of the type described in the present application are particularly adapted for use, by well known methods such, for example, as those described in American Institute of Mining and Metallurgical Engineers Technical Publication No. 2427, August 1948, and in U. S. Patents Nos. 2,198,120 and 2,236,147, in sealing the walls of wells, shafts and the like since the long setting times possible with the present gels permit sufficient penetration of porous formations before setting of the gels to provide complete sealing thereof. The present novel gels may also be used to impregnate soil to prevent its becoming saturated with water and thus rendered unstable or, as with irrigation ditches, to prevent loss of water therethrough. Impregnation of the soil around pipe lines, buried tanks and the like is also feasible as a means of protecting such structures from corrosion by ground waters.

The usefulness of novel gels formed in accordance with the present invention for the prevention of corrosion demonstrates further the unique character of these products. It has been found that these gels have weak anion exchange properties. Consequently in the presence of water any unreacted boric acid remaining in the gel will be acted upon by the gel and an alkaline reaction will be produced. It will be understood that after the reaction of the trivalent chromium with the phenolic groups to form the gel, any boric acid remaining is no longer a strong acid but is again quite weak. No such alkaline reaction is obtained with acids stronger than boric acid. This has been demonstrated by comparative tests. In one test 2 grams of a gel made according to Example 7 was aged for 2 days and then crushed and agitated with 100 ml. of water. After settling, the supernatant water extract was found to have a pH of 7.7. Another gel made in the same way, except for the substitution of 4.8 grams of acetic acid for the boric acid, was likewise prepared. This gel also was aged for 2 days and then crushed. The extract obtained on shaking 2 grams of the second gel with 100 ml. of water had a pH of 6.0.

The singular characteristic of gels according to the present invention giving an alkaline reaction is of great importance. Not only is the alkalinity developed sufficient to neutralize any humic acid in the soil and thus provide effective protection against corrosion to underground pipes, tanks and the like but the lack of acidity in the gels prevents any danger of disintegrating action on limestone when, in connection with drilling or boring operations, porous formations therein must be impregnated to seal off water flow.

It will be recognized that for many of the above-mentioned purposes and for others not enumerated it will be necessary to prolong the setting time of the gel for very long periods. For example, many hours may be required to saturate the ground under and around a section of a large irrigation ditch or to impregnate a porous formation several thousand feet down a well. Obviously, if gel formation occurs too quickly the desired impregnation cannot be obtained as the gel may be formed before there is any appreciable penetration.

As has been indicated in certain of the examples set forth above, the use of both boric acid and borax in the production of gels according to the present invention results in substantially increasing the setting times of the gels in comparison with those of similar compositions in which borax is omitted. Since the speed of the gel-forming reaction is greatly accelerated by increase in temperature, a slow relation rate at ordinary temperatures is often desirable. Thus, for example, when using the gels of the present invention in deep wells or mines to block off water courses or for similar purposes, it frequently happens that the temperature at the place of use is quite high. Accordingly, it will be necessary to adjust the composition of the gel-forming solution so that the accelerating effect of such high temperature is counteracted as far as possible. To slow the gelling time of compositions according to the present invention to meet such conditions borax in comparatively large amounts may be used. It will also sometimes be found advantageous to substitute sodium chromate for sodium dichromate in the compositions, making the substitution in stoichiometric proportions.

The proportions of the ingredients used in gel-forming compositions according to the present invention may, as indicated above, vary considerably from the proportions given in the examples. It will be realized that sulfite waste liquors are of variable composition. In general, however, a ratio on a dry basis of sulfite liquor to crystalline sodium dichromate ($Na_2Cr_2O_7.2H_2O$) of between about 5:1 and about 8:1 is preferred. The optimum ratio in any particular case is dependent upon whether the sulfite liquor has been neutralized or not and upon its actual content of coniferous lignosulfonic acids or lignosulfonates.

As will be understood from earlier portions of this specification, the amount of boric acid employed will depend upon the other materials used. In making gels from sulfite waste liquor the minimum will be that amount necessary to convert lignosulfonates to lignosulfonic acids and dichromates and chromates to chromic acid. In addition a small excess is preferred. In general, with sodium dichromate and calcium lignosulfonates a ratio of boric acid to sodium dichromate between about 9:10 and 11:10 is preferred. With lignosulfonic acids and sodium dichromate the range preferred is between ratios of 4.5:10 and 5.5:10 boric acid to sodium dichromate. When using water in the lower ranges, as discussed in a subsequent paragraph, the solubility of boric acid imposes an upper limit on the amount of it that may be used. The same is the case with borax when it is used. Although raising the solution temperatures to increase solubility is in some cases undesirable since the setting of the gels is thereby accelerated, when high temperatures exist at the place where gel formation is desired, as in underground impregnation, no difficulty in dissolving the necessary amounts of boric acid or borax is encountered. The preferred ratio of borax to borax acid, when the former is used, is between about 1:2 and about 3:1.

In the event that, as suggested above, chromates are substituted for dichromates (for example sodium chromate for sodium dichromate) the boric acid would have to be increased in the stoichiometric proportion required to convert the chromate to chromic acid. Since larger amounts of boric acid are also needed for lignosulfonates than for lignosulfonic acids, it will be evident that the use of both a lignosulfonate and a chromate will require the use of more boric acid than can be dissolved, except at elevated temperatures, in amounts of water giving strong gels. If lower solution temperatures are necessary with such mixtures the boric acid must be supplemented by some other acid, as not enough boric acid can be dissolved. Since such supplemental acid use is likely to result in weakening of the resultant gel or in other undesired effects it is avoided if possible. The use of chromates may also present other difficulties. As has been indicated above, the gel-forming solutions of the present invention are necessarily acid and such solution in each instance should always have a pH of less than 7. Dilute sodium dichromate solutions are, of course, acid but dilute sodium chromate solutions may be as alkaline as pH 10 or higher. Thus, when an alkaline, neutralized sulfite liquor and sodium chromate are used the pH of the mixed solutions may be too high. If borax is also used the pH will be even higher. Accordingly, the possibility of using chromates is limited by the choice of other ingredients.

While the amount of water which may be used in forming gels according to the invention of the present application may vary rather widely in accordance with the firmness or rigidity desired in the gel to be produced, in general it is desirable in forming relatively stiff gels to use water in proportions of from about 16:1 to 21:1 with respect to the amount of sodium dichromate used. The ratio may be increased to from 35:1 to 45:1 when softer or weaker gels are permissible or when a very long time is required for impregnation with a gel-forming solution. Such a condition would exist, for example, in the event that impregnation was desired of a very large volume of soil, such as an earthen dam, to prevent seepage therethrough. In calculating the water used, that included in the sulphite waste liquor and as water of crystallization in the various other ingredients is included. Smaller proportions of water than those specified above as preferred are generally not desirable or possible since there may be difficulty in dissolving the requisite amounts of reacting materials in a small volume of water.

Sulfite waste liquors normally contain as impurities appreciable quantities of materials other than lignosulfonic acids. Such impurities and the reaction products obtained when the liquors are neutralized do not interfere with the formation of gels according to the present invention. Indeed the presence of inert materials is sometimes desirable. Thus, for example, in order to keep the gel-forming solution in place below water having a specific gravity greater than 1 because of dissolved salts, it may be necessary to increase the specific gravity of the gel-forming liquid with some inert material such as sodium chloride. Solid inert materials may be added if the use of such mixtures is indicated. If a high specific gravity mixture is desired, clay or even barite (heavy spar) may be used. If increased bulk without weight increase is wanted, lighter materials such as sawdust can be employed.

The novel gels of the present invention may, if desired, be dried by exposure to a dry atmosphere. Drying may be hastened by heating at temperatures below about 250° F. The dried gels are, of course, denser and harder than the gels as formed and may have water contents ranging between about 1 percent and 20 percent, or more. Water will be reabsorbed, even though the gels are insoluble, and the dried gels will swell if they are brought into contact with aqueous liquids. Gels in which the water content has not been reduced below about 15 percent are more easily thus reconstituted than are gels which have been dried to a greater degree. The dried gels may be crushed or ground if desired. In some cases, mixtures of a granular dried gel and water may be advantageously used instead of a gel-forming solution for certain of the purposes herein described. For example, the dried gel particles may be carried into the pores of a pervious rock formation where in swelling they seal the pores.

It will be understood that many variations and modifications of the procedures described herein may be made without departing from the spirit of the present invention. Consequently, it is desired that the invention shall not be considered limited by the precise examples given above but shall be interpreted as broadly as permitted by the appended claims.

I claim:

1. A process for forming a water-insoluble gel which comprises reacting together, at a pH of less than 7, aqueous solutions of a polyhydric phenol and a sufficient amount of at least one chromium compound selected from the group consisting of chromates and dichromates to form a gel with said polyhydric phenol in the presence of an amount of boric acid in excess of the amount required to convert said chromium compound to chromic acid.

2. A process as set forth in claim 1 in which borax in a ratio of from about 1:2 to 3:1 with respect to the amount of boric acid is also present in aqueous solution.

3. A process for forming a water-insoluble gel which comprises reacting together, at a pH of less than 7, aqueous solutions of at least one material selected from the group consisting of coniferous lignosulfonic acids and coniferous lignosulfonates and a sufficient amount of at least one chromium compound selected from the group consisting of chromates and dichromates to form a gel therewith in the presence of an amount of boric acid in excess of the amount required to convert said chromium compound to chromic acid and to convert any lignosulfonates present to lignosulfonic acids.

4. A process as set forth in claim 3 in which borax in a ratio of from about 1:2 to 3:1 with respect to the amount of boric acid is also present in aqueous solution.

5. A process for forming a water-insoluble gel which comprises reacting together, at a pH of less than 7, aqueous solutions of coniferous sulfite liquor, at least one chromium compound selected from the group consisting of chromates and dichromates in the presence of an amount of boric acid in excess of the amount required to convert any lignosulfonates present in said sulfite liquor to lignosulfonic acids and to convert said chromium compound to chromic acid, said chromium compound being present in an amount sufficient to form a gel with the lignosulfonic acids present and formed in said sulfite liquor.

6. A process as set forth in claim 5 in which borax in a ratio of from about 1:2 to 3:1 with respect to the amount of boric acid is also present in aqueous solution.

7. A process for impregnating porous ground formations with a water-insoluble gel which comprises introducing into such a formation an aqueous solution having a pH of less than 7 containing coniferous sulfite liquor, at least one chromium compound selected from the group consisting of chromates and dichromates, and boric acid, said boric acid being present in excess of the amount required to convert any lignosulfonates present in said sulfite liquor to lignosulfonic acids and to convert said chromium compound to chromic acid, and said chromium compound being present in an amount sufficient to form a gel with the lignosulfonic acids present and formed in said sulfite liquor.

8. A process as set forth in claim 7 in which said aqueous solution also contains borax in a ratio of from about 1:2 to 3:1 with respect to the amount of boric acid.

9. A process for forming a water-insoluble gel which comprises reacting together, at a pH of less than 7, aqueous solutions of at least one material selected from the group consisting of tannic acid and vegetable tannins and a sufficient amount of at least one chromium compound selected from the group consisting of chromates and dichromates to form a gel therewith in the presence of an amount of boric acid in excess of the amount required to convert said chromium compound to chromic acid.

10. A process as set forth in claim 9 in which borax in a ratio of from about 1:2 to 3:1 with respect to the amount of boric acid is also present in aqueous solution.

11. The substantially water-insoluble gel resulting from the process of claim 1.

12. The substantially water-insoluble gel resulting from the process of claim 2.

13. The substantially water-insoluble gel resulting from the process of claim 3.

14. The substantially water-insoluble gel resulting from the process of claim 4.

15. The substantially water-insoluble gel resulting from the process of claim 5.

16. The substantially water-insoluble gel resulting from the process of claim 6.

17. The substantially water-insoluble gel resulting from the process of claim 9.

18. The substantially water-insoluble gel resulting from the process of claim 10.

References Cited in the file of this patent

UNITED STATES PATENTS

| | | |
|---|---|---|
| 1,143,714 | Knight | June 22, 1915 |
| 1,553,220 | Cross | Sept. 8, 1925 |
| 2,280,600 | Muller | Apr. 21, 1942 |
| 2,503,297 | Pierce | Apr. 11, 1950 |
| 2,589,252 | Heritage et al. | Mar. 18, 1952 |
| 2,742,090 | Garrison | Apr. 17, 1956 |